(12) United States Patent
Dar (10) Patent No.: US 11,044,214 B2
(45) Date of Patent: Jun. 22, 2021

(54) MULTIMEDIA FILE ADAPTION ACROSS DIFFERENT COMMUNICATION PLATFORMS

(71) Applicant: T-Mobile USA, Inc., Bellevue, WA (US)

(72) Inventor: Sheraz Dar, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 822 days.

(21) Appl. No.: 15/389,988

(22) Filed: Dec. 23, 2016

(65) Prior Publication Data

US 2018/0183741 A1   Jun. 28, 2018

(51) Int. Cl.
   *G06F 15/16*    (2006.01)
   *H04L 12/58*    (2006.01)
   *H04L 12/861*   (2013.01)

(52) U.S. Cl.
   CPC ............ *H04L 51/06* (2013.01); *H04L 51/066* (2013.01); *H04L 51/10* (2013.01); *H04L 49/9057* (2013.01)

(58) Field of Classification Search
   CPC . H04L 51/10; H04L 65/4069; H04L 12/1877; H04L 29/06027; H04L 51/06; H04L 51/063; H04W 4/18
   See application file for complete search history.

(56) References Cited

U.S. PATENT DOCUMENTS

| 10,110,694 | B1* | 10/2018 | Watson | H04L 67/2842 |
|---|---|---|---|---|
| 2002/0157089 | A1* | 10/2002 | Patel | G06F 8/65 |
|  |  |  |  | 717/178 |
| 2006/0234684 | A1* | 10/2006 | Shin | H04N 21/4788 |
|  |  |  |  | 455/414.1 |
| 2007/0115987 | A1* | 5/2007 | Hoekstra | H04L 61/2557 |
|  |  |  |  | 370/392 |
| 2007/0198731 | A1* | 8/2007 | Li | H04M 1/72555 |
|  |  |  |  | 709/230 |
| 2008/0222201 | A1* | 9/2008 | Chen | G06F 16/58 |
| 2010/0161829 | A1* | 6/2010 | Kumaran | H04L 47/41 |
|  |  |  |  | 709/233 |
| 2011/0257772 | A1* | 10/2011 | Kerber | H04L 67/34 |
|  |  |  |  | 700/94 |
| 2012/0296882 | A1* | 11/2012 | Lee | H04L 67/06 |
|  |  |  |  | 707/693 |

(Continued)

*Primary Examiner* — Oleg Survillo
(74) *Attorney, Agent, or Firm* — Han Santos, PLLC (57) ABSTRACT

The disclosure sets forth techniques that enable mobile devices to send and receive multimedia files across dissimilar communication platforms. Multimedia files being sent between mobile devices may be subject to file size limits, based on the communication platform being used and the capability metrics of the mobile devices. This disclosure describes techniques for transmitting a multimedia file as a plurality of segment files, for the purpose of conforming with file size limits associated with a sending device or a recipient device. A multimedia file may be partitioned into a plurality of segment files that may be re-combined into a single multimedia file that substantially reproduces the multimedia content of the original multimedia file. Further, a multimedia file may be partitioned into a plurality of playable segment files that, when executed or played individually and in sequential order, substantially reproduce the multimedia content of the original multimedia file.

19 Claims, 8 Drawing Sheets

(56) References Cited

U.S. PATENT DOCUMENTS

| | | | |
|---|---|---|---|
| 2013/0260802 A1* | 10/2013 | Mayblum | H04W 4/14 |
| | | | 455/466 |
| 2014/0250158 A1* | 9/2014 | Tang | H04L 67/06 |
| | | | 707/827 |
| 2015/0100635 A1* | 4/2015 | Huang | H04L 65/403 |
| | | | 709/204 |
| 2017/0142186 A1* | 5/2017 | Xiao | H04L 67/06 |
| 2017/0264481 A1* | 9/2017 | Chanda | H04L 41/082 |
| 2020/0014486 A1* | 1/2020 | Harrang | H04L 65/80 |

* cited by examiner

MULTIMEDIA FILE ADAPTION ACROSS DIFFERENT COMMUNICATION PLATFORMS

BACKGROUND

Present day, telecommunications networks, such as cellular wireless networks, provide subscribers with various messaging platforms for communicating multimedia data. These messaging platforms may allow subscribers to share multimedia files via rich communication service (RCS) platforms or multi-media messaging service (MMS) platforms. Typically, telecommunication networks can seamlessly share multimedia files that are sent and received on a common messaging platform, such as RCS-to-RCS (i.e., sender messaging platform-to-recipient messaging platform), or MMS-to-MMS. However, sharing multimedia files across different messaging platforms, such RCS-to-MMS, or vice versa, can present its own challenges.

Typically, an MMS platform may share multimedia files between sender and recipient telecommunication devices, based on the capabilities of those devices. That is, some telecommunication devices limit the file size of multimedia files that can be sent and/or received via an MMS platform. In the event that a multimedia data file exceeds a prescribed file size limit of a sender or recipient device, the file transfer may fail. To overcome this limitation, an MMS network element may transcode the multimedia file to reduce its file size to within file size limits prescribed by the sender and recipient devices. However, transcoding a multimedia file can degrade the quality of its video, image, or audio content.

On the other hand, an RCS platform may enable telecommunication devices to deliver multimedia files that are relatively larger in file size when compared to multimedia files communicated via an MMS platform. Unlike, an MMS platform, an RCS platform need not impose file size restrictions based on the capability of the sending and recipient devices. Instead, file transfers are performed in real-time over a network session established between the sender and recipient devices. However, an RCS platform may communicate multimedia files between sending and recipient devices when both devices are online and share a common real-time network session. Thus, unlike an MMS platform, if the recipient device is offline, the recipient device will not receive the multimedia file.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The disclosure sets forth systems and techniques that enable mobile devices to send and receive multimedia files across dissimilar communication platforms. For example, a sending device may use a first communication platform to transmit a multimedia file to an intended recipient device that may use a different, second communication platform. The first communication platform and the second communication platform may correspond to one of a multimedia messaging service (MMS) platform, a Rich Communication Services (RCS) platform, an electronic mail (e-mail) messaging service, or any other communication platform capable of sending and receiving multimedia files.

In some examples, multimedia files being sent from a sending device to a recipient device may be subject to file size limits. The file size limits may be based on the communication platform used by the sending device or the recipient device, and the capability metrics of the sending device or the recipient device. For example, the size of a multimedia file being sent and/or received via an MMS platform may be limited based on the capability metrics of the sending device or the recipient device. In various examples, the capability metrics may include at least one of processor, memory, input/output interface, and telecommunication data metrics of the respective sending device or recipient device. In a non-limiting example, a service provider may determine that the size of a multimedia file being sent by a sending device may exceed a predetermined file size limit based at least in part on the capability metrics of the sending device. In this example, the service provider may "fail to send" the multimedia file, and notify the sending device of the same. In another non-limiting example, a service provider may determine that the size of the multimedia file that is intended for receipt by a recipient device, exceeds a prescribed file size limit, based at least in part on the capability metrics of the recipient device. In this example, the service provider may "drop" (i.e., fail to deliver) the multimedia file to the recipient device. However, in this example, the recipient device is not notified by the service provider that the multimedia file failed delivery.

This disclosure describes techniques that help alleviate a failure to send a multimedia file that has exceeded a predetermined file size associated with the sending device. Particularly, a "client multimedia adaption" application, native to a sending device, may partition a multimedia file into a plurality of segment files. Each segment file may conform with a file size limit associated with the sending device, and based on capability metrics of the sending device. In doing so, the sending device may be capable of transmitting the plurality of segment files to a recipient device despite being unable to send the original multimedia file, in its unitary form, due to its file size.

Further, this disclosure describes techniques that help alleviate a failure to deliver a multimedia file that has exceeded a predetermined file size associated with a recipient device. Particularly, a "platform multimedia adaption" application, native to a platform server (i.e. service provider), may partition a multimedia file received from a sending device, into a plurality of segment files prior to delivery to a recipient device. Each segment file may conform with a file size limit associated with the recipient device, and based on capability metrics of the recipient device.

Additionally, the "client multimedia adaption" application, may be native to the recipient device, and subsequently re-combine the plurality of segment files into a single multimedia file that substantially reproduces the multimedia content of the original multimedia file.

A benefit of partitioning a multimedia file into a plurality of segment files is that the quality of content within the multimedia file need not be compromised in order to reduce the size of the multimedia file. For example, absent a capability of partitioning a multimedia file into a plurality of segment files, a service provider may transcode data elements within the multimedia file to reduce its file size to below a predetermined file size limit. However, transcoding a multimedia file may distort or degrade the quality of multimedia content within a multimedia file relative to its original presentation. Thus, by partitioning the multimedia file into a plurality of segment files that each confirm with a predetermined file size limit, each segment file may retain substantially the same quality of multimedia content relative to the original multimedia file, while also meeting the file size limits required for transmission.

Further, this disclosure describes techniques that enables a service provider (i.e. platform server) to transmit a plurality of playable segment files that when executed or played individually and in sequential order, re-create the multimedia content of the original multimedia file. Particularly, the service provider may determine that a recipient device does not have the client multimedia adaption application installed, and thus is unable to re-create the original multimedia file by merging the plurality of segment files. In doing so, the techniques described herein may enable the service provider (i.e. platform server) to generate a plurality of playable segment files that do not require use of the client multimedia adaption application.

In various examples, the sending device may transmit a multimedia data packet that includes a multimedia file from a communication platform such as an RCS platform. The multimedia data packet that is received from the sending device may further include a recipient platform identifier that identifies a recipient communication platform and an intended recipient device identifier. As described herein, an "RCS platform" may send multimedia files between mobile devices by establishing a real-time network session between the sending device and the recipient device. Unlike an MMS platform, the RCS platform need not impose file size limits to multimedia files based on the capability of the sending device and the recipient device. However, an RCS platform may only transfer multimedia files at times when both the sending device and recipient device are "online" and share a common real-time network session. Unlike an MMS platform, a recipient device may not receive a multimedia file via an RCS platform when the recipient device is "offline." The terms "online" and "offline" are used herein to indicate a state of connectivity of a sending device and/or recipient device to the RCS platform.

In some examples, the multimedia data packet received from the sending device may indicate that the recipient communication platform is an RCS platform. In this instance, the service provider may determine whether the recipient device is "online" or "offline". If the recipient device is "offline", then a real-time network session cannot be established with an RCS platform of the sending device. Therefore, the service provider may execute instructions that transmit the multimedia file to an alternate communication platform associated with the recipient device, such as an MMS platform. If the alternate communication platform imposes file size limits for multimedia files, then the service provider may partition the multimedia file into a plurality of segment files that meet file size limits of the alternate communication platform. The service provider may then transmit the plurality of segment files to the recipient device via the alternate communication platform. It is noteworthy that the service provider may receive the multimedia file from the sending device via any communication platform that is capable of sending multimedia files such as, but not limited to, an RCS platform, an e-mail service platform, or an MMS platform.

The term "multimedia file" as used herein may describe files such as, but not limited to, voice message files, text files, video files, image files, audio files, and data files. Further, the term "techniques," as used herein, may refer to system(s), method(s), computer-readable instructions, module(s), algorithms, hardware logic, and/or operation(s) as permitted by the context described above and throughout the document.

Figure 1:
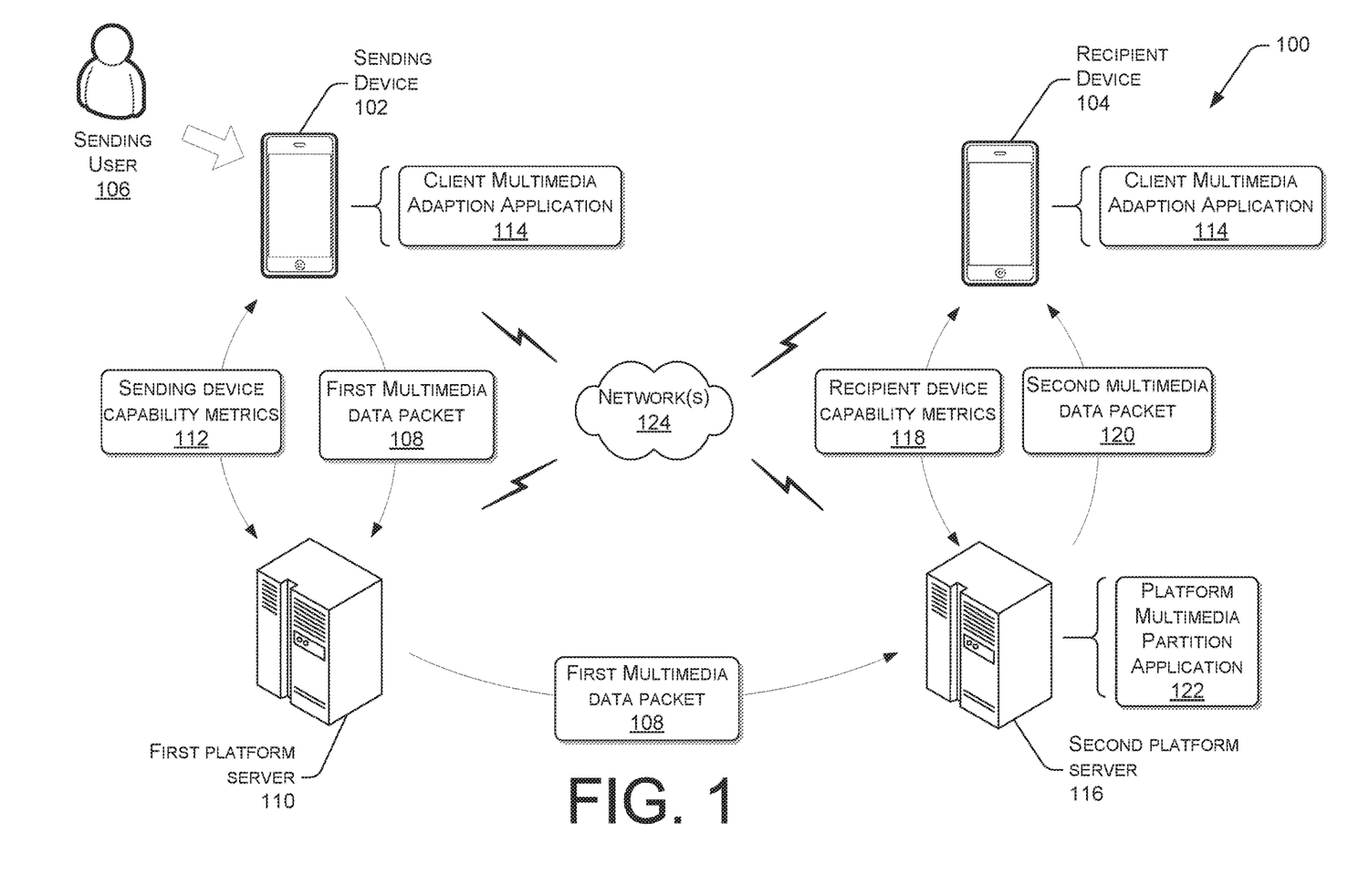
FIG. 1 illustrates a schematic view of a computing environment 100 that facilitates a sending device transmitting a multimedia file via a first communication platform, to a recipient device that uses a disparate, second communication platform.

FIG. 1 illustrates a schematic view of a computing environment 100 that facilitates a sending device 102 transmitting a multimedia file via a first communication platform, to a recipient device 104 that uses a disparate, second communication platform. In the illustrated example, a sending user 106 may use the sending device 102 to initiate delivery of a multimedia file to a recipient device 104. In doing so, the sending device 102 may generate a first multimedia data packet 108 that includes the multimedia file and a recipient identifier. In a non-limiting example, the recipient identifier may include at least one of a recipient device identifier or a recipient platform identifier.

Thereafter, the first multimedia data packet 108 may be directed to a first platform server 110 that corresponds to the communication platform used by the sending device 102. In some examples, the communication platform associated with the sending device 102 may limit the file size of the first multimedia data packet 108 being sent from the sending device 102. For example, the first platform server 110 may correspond to an MMS platform. The MMS platform may impose a file size limit on the first multimedia data packet 108, based on capability metrics 112 of the sending device 102. The MMS service platform (i.e. first platform server 110) may request and receive capability metrics 112 from the sending device 102 and accordingly determine whether a file size limit is to be imposed on the first multimedia data packet 108. In the event that the MMS service platform (i.e. first platform server 110) imposes a file size limit, the client multimedia adaption application 114, native to the sending device 102, may partition the multimedia file of the first multimedia data packet 108 into a plurality of segment files that each conform with the file size limit of the sending device 102. In doing so, the first multimedia data packet 108 sent to the MMS service platform (i.e. first platform server 110) may include a plurality of segment files, rather than the multimedia file, along with the recipient identifier. Each segment file may include header data that indicates a placement order of the segment file relative to the remaining plurality of segment files.

Alternatively, the first platform server 110 may not limit the file size of the first multimedia data packet 108 being sent from the sending device 102. For example, the first platform server 110 may correspond to an RCS platform. An RCS platform (i.e. first platform server 110) may send the first multimedia data packet 108 to a recipient device 104 by establishing a real-time network session. Thus, the RCS platform may not impose a file size limit that is based on capability metrics of the sending device 102. That is, the first multimedia data packet 108 may be directed from the sending device 102 to the first platform server 110 irrespective of its file size. Further, the first platform server 110 may also correspond to any other communication platform, such as an email server platform, that need not impose a file size limit on the first multimedia data packet 108 that is based on capability metrics of the sending device 102. In this instance, the first multimedia data packet 108 may be directed to the first platform server 110 (i.e. email server platform) irrespective of its file size.

In the illustrated example, the first platform server 110 may transmit the first multimedia data packet 108 to a second platform server 116 associated with the recipient device 104. The first platform server 110 may identify the second platform server 116 based on the recipient platform identifier within the first multimedia data packet 108. In a non-limiting example, the first multimedia data packet 108 may include a single multimedia file. The second platform server 116 may request and receive capability metrics 118 from the recipient device 104 and accordingly determine whether a file size limit should apply to the single multimedia file of the first multimedia data packet 108. In the event a file size limitation is imposed, a client multimedia adaption application 114, native to the second platform server 116, may partition the single multimedia file into a plurality of segment files. Each segment file may be configured to conform with the file size limit associated with the recipient device 104. In doing so, a second multimedia data packet 120, which includes the plurality of segment files, may be sent to the recipient device 104. Each segment file may include header data that indicates a placement order of the segment file relative to the remaining plurality of segment files.

In another non-limiting example, the first multimedia data packet 108 may include a first plurality of segment files, rather than a single multimedia file. The first plurality of segment files may be configured to conform with a file size limit imposed by the first platform server 110, and based on the capability metrics 112 associated with the sending device 102. Thus, a platform multimedia adaption application 122, native to the second platform server 116, may be configured to transmit the first plurality of segment files, as received from the first platform server 110 to the recipient device 104, provided that each segment file conforms with a file size limit associated with the recipient device 104. Alternatively, the second platform server 116 may determine that the file size limit associated with the recipient device 104 is less than the file size limit associated with the sending device 102. In this instance, the platform multimedia adaption application 122 may combine the first plurality of segment files to create a single multimedia file, and further partition the single multimedia file into a second plurality of segment files that conform with a file size limit associated with the recipient device 104.

In the illustrated example, the second platform server 116 may direct a second multimedia data packet 120 to the recipient device 104. In some examples, the second multimedia data packet 120 may include the original multimedia file from the first multimedia data packet 108, provided that the file size of the original multimedia file is less than a file size limit associated with the recipient device 104. In other examples, the second multimedia data packet 120 may include a plurality of segment files that when combined, may substantially reproduce the multimedia content of the original multimedia file. Each segment file may include header data that indicates a placement order of the segment file relative to the remaining plurality of segment files. Additionally, the client multimedia adaption application 114, native to the recipient device 104, may combine the plurality of segment files to substantially reproduce the multimedia content of the original multimedia file.

In the illustrated example, the sending device 102 and the recipient device 104 may include any sort of electronic device, such as a cellular phone, a smart phone, a tablet computer, an electronic reader, a media player, a gaming device, a personal computer (PC), a laptop computer, etc. The sending device 102 and the recipient device 104 may have a subscriber identity module (SIM), such as an eSIM, to identify the sending device 102 and the recipient device 104 to a telecommunication service provider network (also referred to herein as "telecommunication network").

Further, the first platform server 110 and the second platform server 116 may include one or more interfaces that enable communications with electronic device(s), such as the sending device 102 and the recipient device 104, via one or more network(s) 124.

In the illustrated example, the one or more network(s) 124 may include public networks such as the Internet, private networks such as an institutional and/or personal intranet, or some combination of private and public networks. The one or more network(s) 124 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
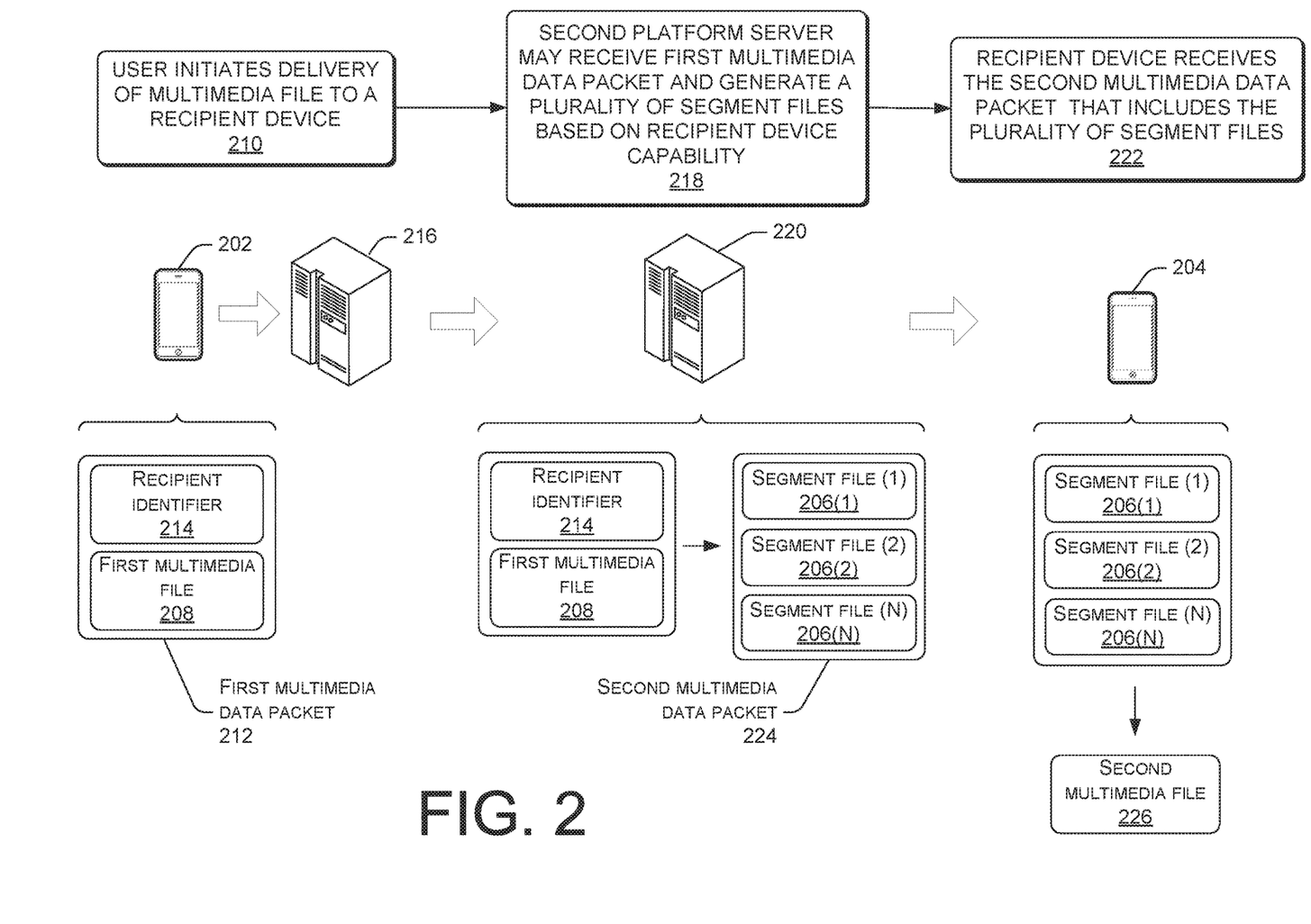
FIG. 2 illustrates a block diagram of steps for sending device transferring a multimedia file to a recipient device as a plurality of segment files that can be merged together to create the multimedia content of the multimedia file.

FIG. 2 illustrates a block diagram of steps that describe a sending device 202 transferring a multimedia file to a recipient device 204 as a plurality of segment files 206 that can be merged together to create the multimedia content of the first multimedia file 208. At step 210, the sending device 202 may initiate delivery of a first multimedia file 208 to a recipient device 204 by generating a first multimedia data packet 212. The first multimedia data packet 212 may include the first multimedia file 208 and a recipient identifier 214. Further, the first multimedia data packet 212 may be directed to a first platform server 216 associated with the sending device 202. In the illustrated example, the first platform server 216 may correspond to an RCS platform or an email server platform that need not impose a file size limit on the first multimedia data packet 212.

Further, the recipient identifier 214 of the first multimedia data packet 212 may include a device identifier and a platform identifier. The device identifier may correspond to an international mobile subscriber identity (IMSI) number. An IMSI number and its related key can be used to identify and authenticate subscribers on a mobile device. Alternatively, the device identifier may correspond to Mobile Station International Subscriber Directory Number (MSISDN), which may describe a primary key to a record that contains details of a user that is authorized on a network. The platform identifier may correspond to specific address that directs the multimedia file to an intended application on the recipient device 204. In a non-limiting example, the recipient device 204 may execute a software application that is associated with a Rich Communications Services (RCS) platform. The platform identifier may correspond to a gateway domain address that allows data, such as a multimedia file, to be directed to the software application. In another non-limiting example, the platform identifier may correspond to a phone number associated with the recipient device 204, which may direct multimedia data to a MMS server, and ultimately to an MMS application that is native on the recipient device 204. In yet another example, the platform identifier may correspond to an email address that directs data, such as a multimedia file, to an e-mail server, and ultimately to an e-mail software application that is native on the recipient device 204.

At step 218, the first platform server 216 may transmit the first multimedia data packet 212 to a second platform server 220 associated with the recipient device 204. The first platform server 216 may identify the second platform server 220 based on the recipient identifier 214 of the first multimedia data packet 212. In the illustrated example, the second platform server 220 may request and receive capability metrics from the recipient device 204 and accordingly determine that a file size limit is to be applied to the first multimedia file 208. In doing so, a platform multimedia adaption application, native to the second platform server 220, may partition the first multimedia file 208 into a plurality of segment files 206(1), 206(2), and 206(N), such that each segment file conforms with the file size limit associated with the recipient device 204. Further, each segment file may include header data that indicates a placement order of the segment file relative to the remaining plurality of segment files 206.

At step 222, a recipient device 204 may receive a second multimedia data packet 224 from the second platform server 220, the second multimedia data packet 224 including the plurality of segment files 206. A client multimedia adaption application, native to the recipient device 204, may combine the plurality of segment files 206 to create a second multimedia file 226 that substantially reproduces the multimedia content of the first multimedia file 208.

Figure 3:
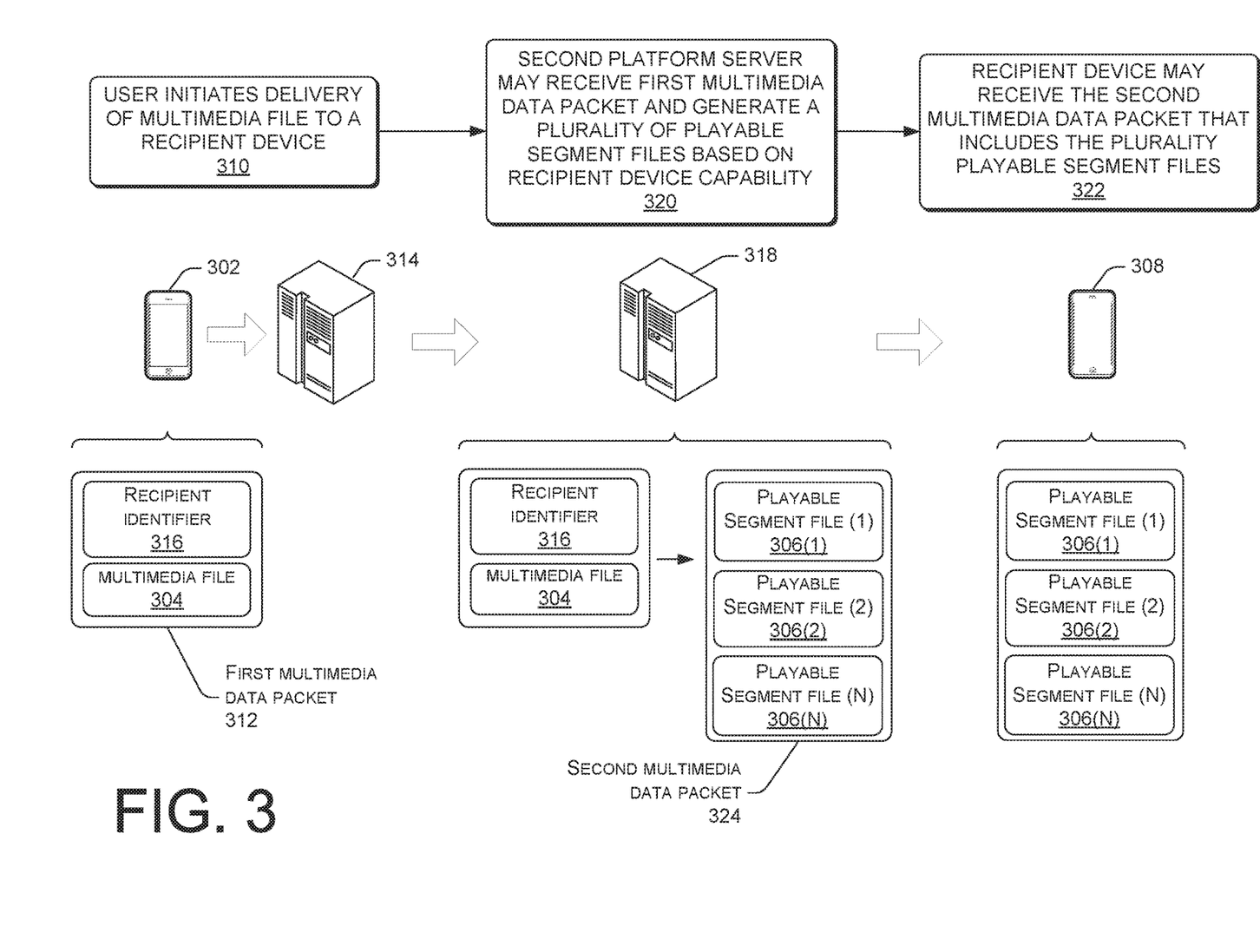
FIG. 3 illustrates a block diagram of steps for sending device transmitting a multimedia file to a recipient device as a plurality of playable segment files.

FIG. 3 illustrates a block diagram of steps for sending device 302 transmitting a multimedia file 304 as a plurality of playable segment files 306 to a recipient device 308. The multimedia file 304 may correspond to a video file, an audio file, or another data file type that is capable of being partitioned into a plurality of playable segment files 306, whereby each segment file may be executed or played individually on the recipient device 308. It is noteworthy that the plurality of playable segment files 306, when executed or played individually and in sequential order, may substantially reproduce the multimedia content of the multimedia file 304. A benefit of transmitting a plurality of playable segment files 306 to a recipient device 308 may include accommodating a recipient device 308 that does not have a client multimedia adaption application installed, and thus may be unable to combine a plurality of segment files to create a single, playable, multimedia file.

At step 310, a sending device 302 may initiate delivery of a multimedia file 304 to a recipient device 308 by generating a first multimedia data packet 312 that is directed to a first platform server 314 associated with the sending device 302. The first multimedia data packet 312 may include the multimedia file 304 and a recipient identifier 316. In the illustrated example, the first platform server 314 may correspond to an RCS platform or an email server platform that need not impose a file size limit on the first multimedia data packet 312.

Further, the first platform server 314 may transmit the first multimedia data packet 312 to a second platform server 318 associated with the recipient device 308. The first platform server 3 14 may identify the second platform server 318 based on the recipient identifier 316 of the first multimedia data packet 312. In the illustrated example, the second platform server 318 may request and receive capability metrics from the recipient device 308 and accordingly determine that a file size limit should apply to the multimedia file 304 of the first multimedia data packet 312. Further, the second platform server 318 may solicit an indication from the recipient device 308 to determine whether a client multimedia adaption application is installed on the recipient device 308.

At step 320, the second platform server 318 may receive an indication from the recipient device 308 that a client multimedia adaption application is not installed on the recipient device 308. In doing so, the platform multimedia adaption application, native to the second platform server 318, may partition the multimedia file 304 into a plurality of playable segment files 306 that when executed or played individually and in sequential order, substantially reproduce the multimedia content of the multimedia file 304. Further, each playable segment file 306(1), 306(2), and 306(N) may be configured to comply with the file size limit associated with the recipient device 308. It is noteworthy that a lack of response, within a predetermined period of time, to the solicitation of whether a client multimedia adaption application is installed on the recipient device 308, may be interpreted as an indication that the client multimedia adaption application is not installed on the recipient device 308.

At step 322, the recipient device 308 may receive a second multimedia data packet 324 from the second platform server 318, the second multimedia data packet 324 including the plurality of playable segment files 306. In the illustrated example, the second multimedia data packet 324 may include the plurality of playable segment files 306 that when executed or played individually and in sequential order, may substantially reproduce the multimedia content of the multimedia file 304 sent by the sending device 302.

Figure 4:
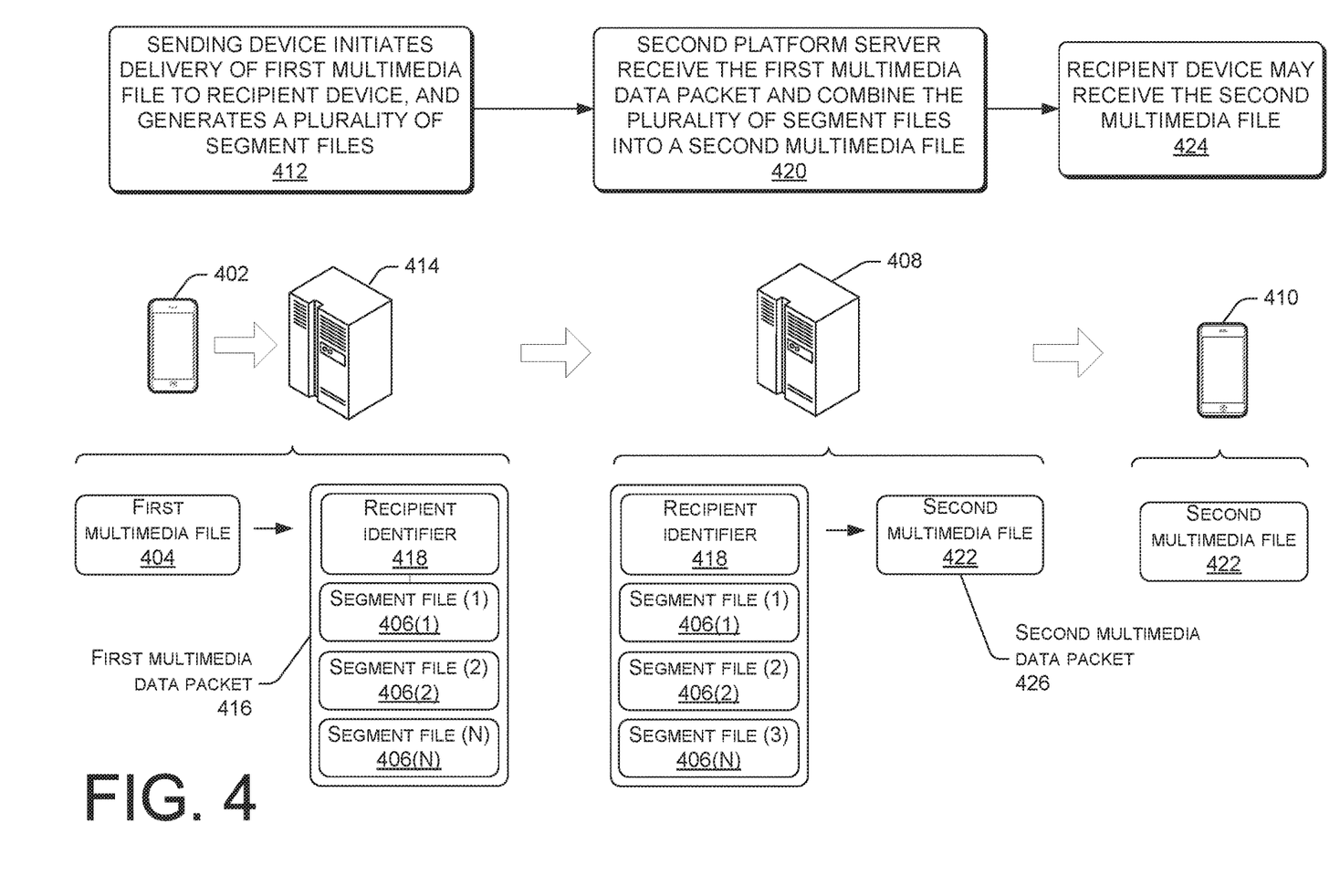
FIG. 4 illustrates a block diagram of steps for sending device partitioning a first multimedia file into a plurality of segment files prior to delivery to a second platform server associated with the recipient device.

FIG. 4 illustrates a block diagram of steps for sending device 402 partitioning a first multimedia file 404 into a plurality of segment files 406 prior to delivery to a second platform server 408 associated with the recipient device 410. At step 412, the sending device 402 may initiate delivery of a first multimedia file 404 to the recipient device 410. In doing so, a first platform server 414 associated with the sending device 402 may request and receive capability metrics from the sending device 402 and accordingly determine that a file size limit should be applied to the first multimedia file 404 prior to transmission from the sending device 402. In a non-limiting example, the first platform server 414 may correspond to an MMS platform. Further, a multimedia adaption application, native to the sending device 402, may partition the first multimedia file 404 into a plurality of segment files 406 such that each segment file conforms with the file size limitation. Each segment file may include header data that indicates a placement order of the segment file relative to the remaining plurality of segment files 406. For example, header data of a particular segment file may indicate that the particular segment file is sequentially positioned third among the plurality of segment files. Further, the sending device 402 may generate a first multimedia data packet 416 that includes the plurality of segment files 406, and a recipient identifier 418.

At step 420, the second platform server 408 may receive the first multimedia data packet 416 from the first platform server 414, the first multimedia data packet 416 including the plurality of segment files 406 and the recipient identifier 418. Further, the second platform server 408 may request and receive capability metrics from the recipient device 410 and accordingly determine that a file size limit may not be necessary. In this example, the second platform server 408 may correspond to an RCS platform or an email server platform. In doing so, the multimedia application, native to the second platform server 408, may combine the plurality of segment files 406 into a second multimedia file 422. The second multimedia file 422 may include substantially the same multimedia content of the first multimedia file 404.

In a first alternative example of step 420, the second platform server 408 may determine that a file size limit should apply to the plurality of segment files 406, based on the capability metrics of the recipient device 410. In this example, the second platform server 408 may determine that the file size of each segment file of the plurality of segment files 406 conforms with the file size limit. In doing so, the second platform server 408 may be configured to transmit the plurality of segment files 406 to the recipient device 410. Further, a discussion relating to generating and transmitting a plurality of segment files can be found within the detailed description of this disclosure as it relates to FIG. 2.

In a second alternative example of step 420, the second platform server 408 may determine that the file size limit associated with the recipient device 410 is less than the file size limit associated with the sending device 402. In this instance, the multimedia adaption application, native to the second platform server 408, may combine the plurality of segment files 406 to create a second multimedia file 422, and then partition the second multimedia file 422 into a second plurality of segment files, whereby each segment file conforms with the file size limit associated with the recipient device 410 (not shown in FIG. 4). Further, a discussion relating to generating and transmitting a plurality of segment files can be found within the detailed description of this disclosure as it relates to FIG. 2.

In a third alternative example of step 420, the second platform server 408 may receive an indication from the recipient device 410, that a client multimedia adaption application is not installed on the recipient device 410. In this instance, the recipient device 410 may be unable to re-combine a plurality of segment files delivered by the second platform server 408. Thus, the multimedia adaption application, native to the second platform server 408, may combine the plurality of segment files 406 to create a second multimedia file 422, and then partition the second multimedia file 422 into a plurality of playable segment files that each conform with the file size limitation associated with the recipient device 410. In this example, the plurality of playable segment files (not shown in FIG. 4), when executed or played individually and in sequential order may substantially reproduce the multimedia content of the first multimedia file 404. Further, a discussion relating to generating and transmitting a plurality of playable segment files can be found within the detailed description of this disclosure as it relates to FIG. 3.

At step 424, the recipient device 410 may receive a second multimedia data packet 426 from the second platform server 408, the second multimedia data packet 426 including the second multimedia file 422. Regarding, the first alternative example of step 420, the second multimedia data packet 426 may include the plurality of segment files 406, as received from the first platform server 414, rather than the second multimedia file 422. Regarding the second alternative example of step 420, the second multimedia data packet 426 may include a second plurality of segment files, whereby each segment file conforms with a file size limit of the recipient device 410, rather than the second multimedia file 422. Regarding the third alternative example of step 420, the second multimedia data packet 426 may include the plurality of playable segment files, rather than the second multimedia file 422.

Figure 5:
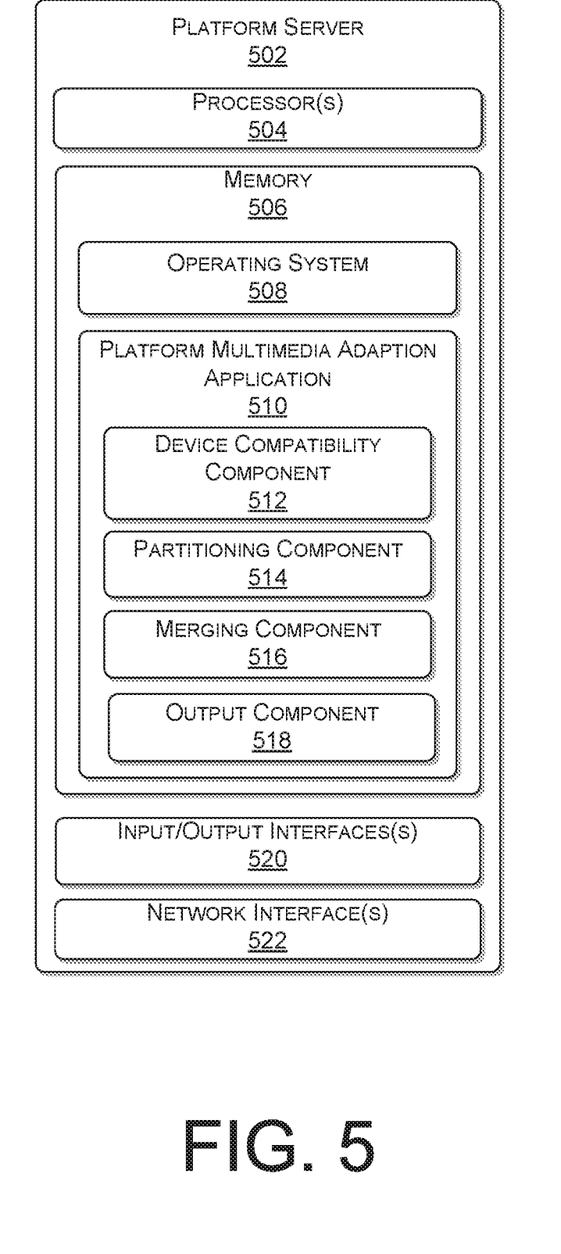
FIG. 5 illustrates a block diagram of a platform server that partitions a multimedia file into a plurality of segment files, and re-compile the segment files into the multimedia file.

FIG. 5 illustrates a block diagram of a platform server 502 that partitions a multimedia file into a plurality of segment files, and recombine the plurality of segment files to substantially reproduce the multimedia content of the multimedia file. The platform server 502 may be further configured to partition a multimedia file into a plurality of playable segment files that when executed or played individually and in sequential order, may substantially reproduce the multimedia content of the multimedia file. In some examples, the platform server may correspond to a multi-media messaging service center (MMS-SC).

In the illustrated example, the platform server 502 may correspond to the first platform server 110, 216, 314, and 414, and the second platform server 116, 220, 318, and 408. Further, the platform server 502 may include one or more processor(s) 504 that are operably connected to memory 506. In at least one example, the one or more processor(s) 504 may be a central processing unit(s) (CPU), graphics processing unit(s) (GPU), a both a CPU and GPU, or any other sort of processing unit(s). Each of the one or more processor(s) 504 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 504 may also be responsible for executing all computer applications stored in the memory, which can be associated with common types of volatile (RAM) and/or nonvolatile (ROM) memory.

In some examples, memory 506 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 506 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 506 may include an operating system 508 and a platform multimedia adaption application 510. The operating system 508 may be used to implement the platform multimedia adaption application 510. The operating system 508 may be any operating system capable of managing computer hardware and software resources. The platform multimedia adaption application 510 may include routines, program instructions, objects, and/or data structures that perform particular tasks or implement particular abstract data types.

In the illustrated example, the platform multimedia adaption application 510 may include a device compatibility component 512, a partitioning component 514, a merging component 516, and an output component 518. The device compatibility component 512 may request and receive capability metrics from a recipient device and accordingly determine whether a file size limit is to be imposed on a multimedia data packet that is intended for delivery to the recipient device. In the event that the device compatibility component 512 imposes a file size limit, the device compatibility component 512 may solicit an indication from the recipient device to determine whether the recipient device has a client multimedia adaption application installed. The client multimedia adaption application may be implemented on the recipient device to re-combine a plurality of segment files that are transmitted to the recipient device to comply with a file size limit. In a non-limiting example, the device compatibility component 512 may receive an indication that a client multimedia adaption application is installed on the recipient device. In doing so, the device compatibility component 512 may send an indication to the partitioning component 514 to partition the multimedia file into a plurality of segment files. The plurality of segment files may be re-combined on the recipient device using the client multimedia adaption application. Alternatively, the device compatibility component 512 may receive an indication that a client multimedia adaption application is not installed on the recipient device. In doing so, the device compatibility component 512 may send an indication to the partitioning component 514 to partition the multimedia file into a plurality of playable segment files, that when executed or played independently and in sequential order, may substantially reproduce the multimedia content of the multimedia file. It is noteworthy that in the event that the device compatibility component 512 does not receive, within a predetermined period of time, a response to the solicitation of whether a client multimedia adaption application is installed on the recipient device, the lack of response may be interpreted as an indication that a client multimedia adaption application is not installed on the recipient device.

Further, the device compatibility component 512 may also send an indication to the partitioning component 514 indicating that the multimedia file need not be partitioned into a plurality of segment files. The device compatibility component 512 may do so in response to receiving capability metrics from the recipient device that indicate that a file size limit need not be imposed to a multimedia file that is intended for delivery to the recipient device. In various examples, the capability metrics of the recipient device may include at least one of processor, memory, input/output interface, and telecommunication data bandwidth metrics.

In the illustrated example, the partitioning component 514 may perform one of two actions based on an indication received from the device compatibility component 512. First, the partitioning component 514 may partition a multimedia file into a plurality of segment files in response to receiving an indication that a recipient device has a client multimedia adaption application installed. Each segment file may include header data that indicates a placement order of the segment file relative to the remaining plurality of segment files. Second, the partitioning component 514 may partition a multimedia file into a plurality of playable segment files in response to receiving an indication that a client multimedia adaption application is not installed on the recipient device. Further, the plurality of playable segment files, when executed or played individually and in sequential order, may substantially reproduce the multimedia content of the multimedia file.

In the illustrated example, the merging component 516 may re-combine a plurality of segment files to generate a single multimedia file that substantially reproduces the multimedia content of the original multimedia file. In some examples, the device compatibility component may request and receive capability metrics from the recipient device and accordingly determine that a file size limit need not be imposed on a second multimedia data packet being sent to the recipient device. In doing so, the merging component 516 may re-combine the plurality of segment files to create a single multimedia file that substantially reproduces the multimedia content of the original multimedia file.

Moreover, the partitioning component 514 and the merging component 516 may operate in combination to generate a plurality of segment files that are based on different file size limits associated with the sending device and the recipient device. In a non-limiting example, the platform server 502 may receive a first plurality of segment files from a sending device, whereby by each segment file complies with a first file size limit associated with the sending device. The device compatibility component 512 may determine that a smaller file size limit is to be imposed on a multimedia data packet being sent to the recipient device based on the capability metrics of the recipient device. In this instance, the merging component 516 may re-combine the first plurality of segment files received from the sending device to generate a single multimedia file that substantially reproduces the multimedia content of the original multimedia file. Further, the partitioning component 514 may partition the single multimedia file into a second plurality of segment files, whereby each segment file complies with the smaller file size limit of the recipient device.

In the illustrated example, the output component 518 may transmit a second multimedia data packet to a recipient device. In a non-limiting example, the second multimedia data packet may include a plurality of segment files or a plurality of playable segment files processed by the partitioning component 514. Alternatively, or additionally, the second multimedia data packet may include a single multimedia file processed by the merging component 516.

Further, the output component 518 may transmit the first multimedia data packet received from the sending device to the recipient device without requiring additional processing by the partitioning component 514 or the merging component 516. In this example, the device compatibility component 512 may determine that a file size limit need not be imposed on a second multimedia data packet being sent to the recipient device. Alternatively, the device compatibility component 512 may determine that a file size limit associated with the recipient device is substantially similar or greater than a file size limit associated with the sending device.

In the illustrated example, the platform server 502 may further include input/output interface(s) 520. The input/output interface(s) 520 may include any type of output interface known in the art, such as a display (e.g. a liquid crystal display), speakers, a vibrating mechanism, or a tactile feedback mechanism. Input/output interface(s) 520 also include ports for one or more peripheral devices, such as headphones, peripheral speakers, or a peripheral display. Further, the input/output interface(s) 520 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the platform server 502 may further include one or more network interface(s) 522. The one or more network interface(s) 522 may include any sort of transceiver known in the art. For example, the one or more network interface(s) 522 may include a radio transceiver that performs the function of transmitting and receiving radio frequency communications via an antenna. In addition, the one or more network interface(s) 522 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the one or more network interface(s) 522 may include wired communication components, such as an Ethernet port or a Universal Serial Bus (USB).

Figure 6:
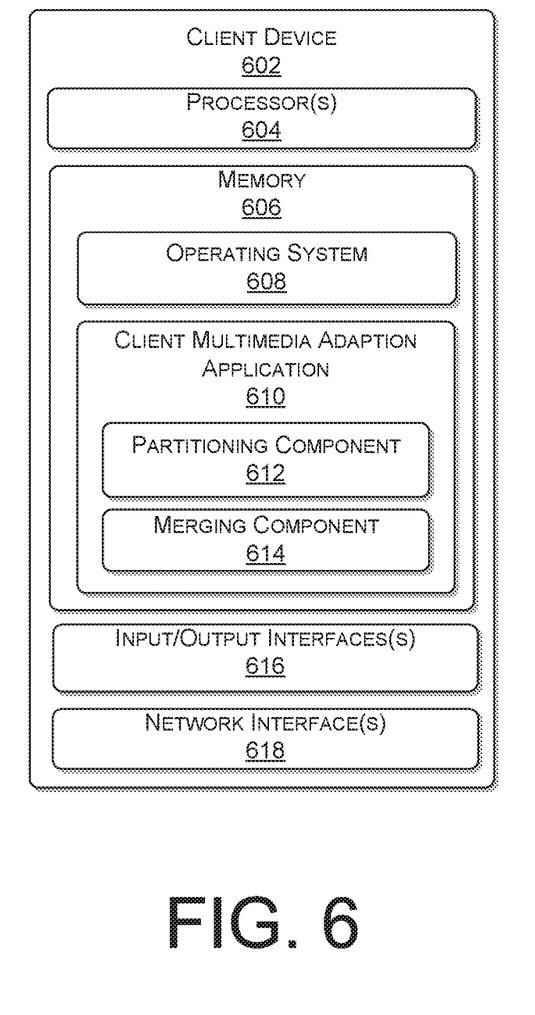
FIG. 6 illustrates a block diagram of a user device that partitions a multimedia file into a plurality of segment files, and re-compile the plurality of segment files into the multimedia file.

FIG. 6 illustrates a block diagram of a client device 602 that can partition a multimedia file into a plurality of segment files, and re-combine the plurality of segment files to substantially reproduce the multimedia content of the multimedia file. The client device 602 may correspond to the sending device 102, 202, 302, and 402, and the recipient device 104, 204, 308, 410. In the illustrated example, the client device 602 may include one or more processor(s) 604 operably connected to memory 606. The one or more processor(s) 604 may correspond to one or more processor(s) 504, and the memory 606 may correspond to the memory 506.

In the illustrated example, the memory 606 may include an operating system 608 and a client multimedia adaption application 610. The operating system 608 may be used to implement the client multimedia adaption application 610. The operating system may be any operating system capable of managing computer hardware and software resources. The client multimedia adaption application 610 may include routines, program instructions, objects, and/or data structures that perform particular tasks or implement particular abstract data types.

In the illustrated example, the client multimedia adaption application 610 may include a partitioning component 612 and a merging component 614. The partitioning component 612 may partition a multimedia file being sent from the client device 602, into a plurality of segment files. Each segment file may include header data that indicates a sequential order of the segment file relative to the remaining plurality of segment files. For example, header data of a particular segment file may indicate that the particular segment file is sequentially ordered third among the plurality of segment files. The partitioning component 612 may do so in response to receiving an indication from a platform server associated with the client device 602, that a file size limit should be imposed on the multimedia file being sent from the client device 602. The merging component 614 may re-combine a plurality of segment files, received by the client device 602, into a single multimedia file that substantially reproduces the multimedia content of an original multimedia file. In some examples, the plurality of segment files may be re-combined based on header data included within each segment file.

In the illustrated example, the client device 602 may include input/output interface(s) 616 and network interface(s) 618. The input/output interface(s) 616 and the network interface(s) 618 may correspond to the input/output interface(s) 520 and the network interface(s) 522 respectively.

Figure 7:
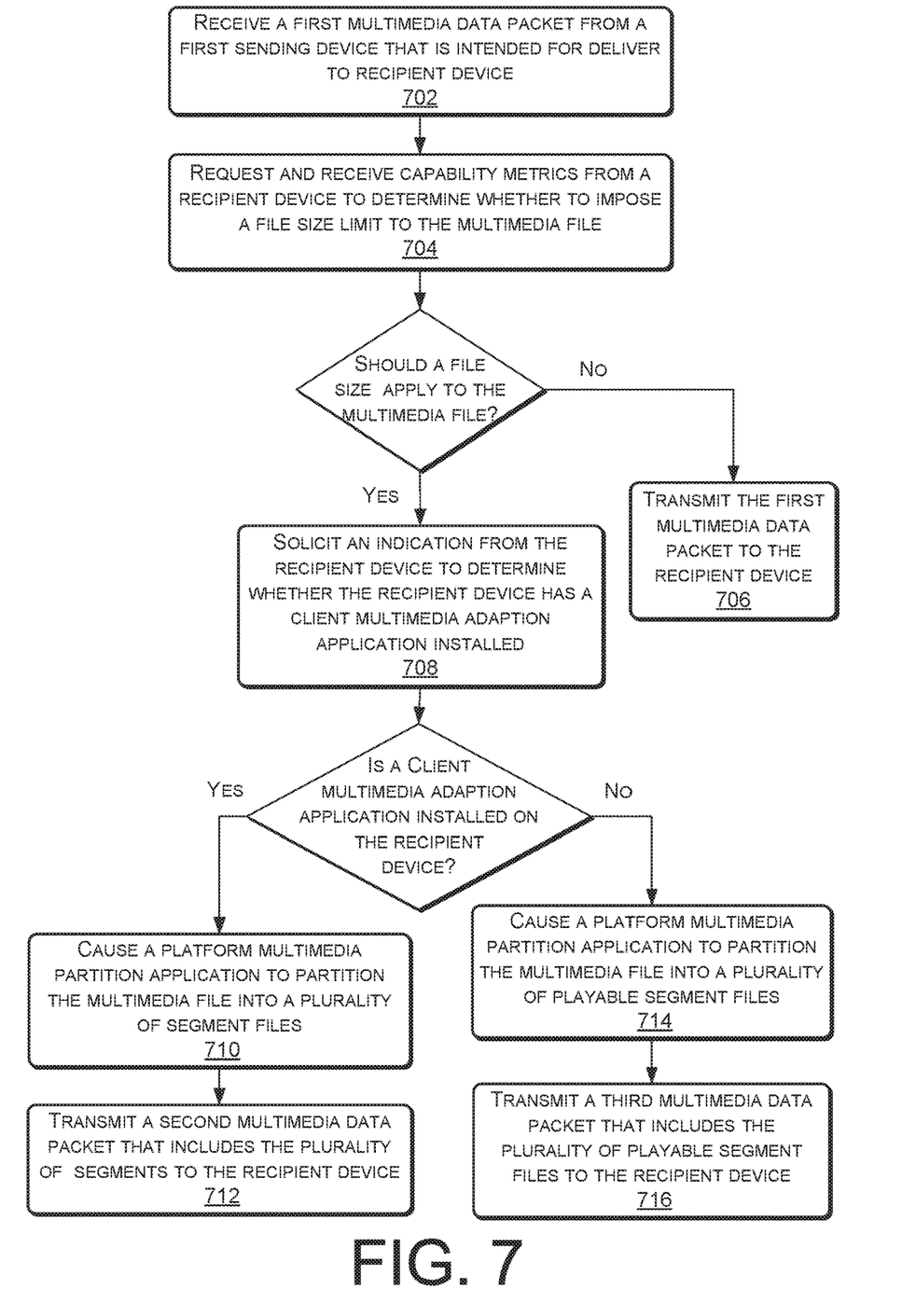
FIG. 7 illustrates a flow diagram of a platform server process for partitioning a multimedia file into a plurality of segment files and transmitting the segment files to a recipient device.
Figure 8:
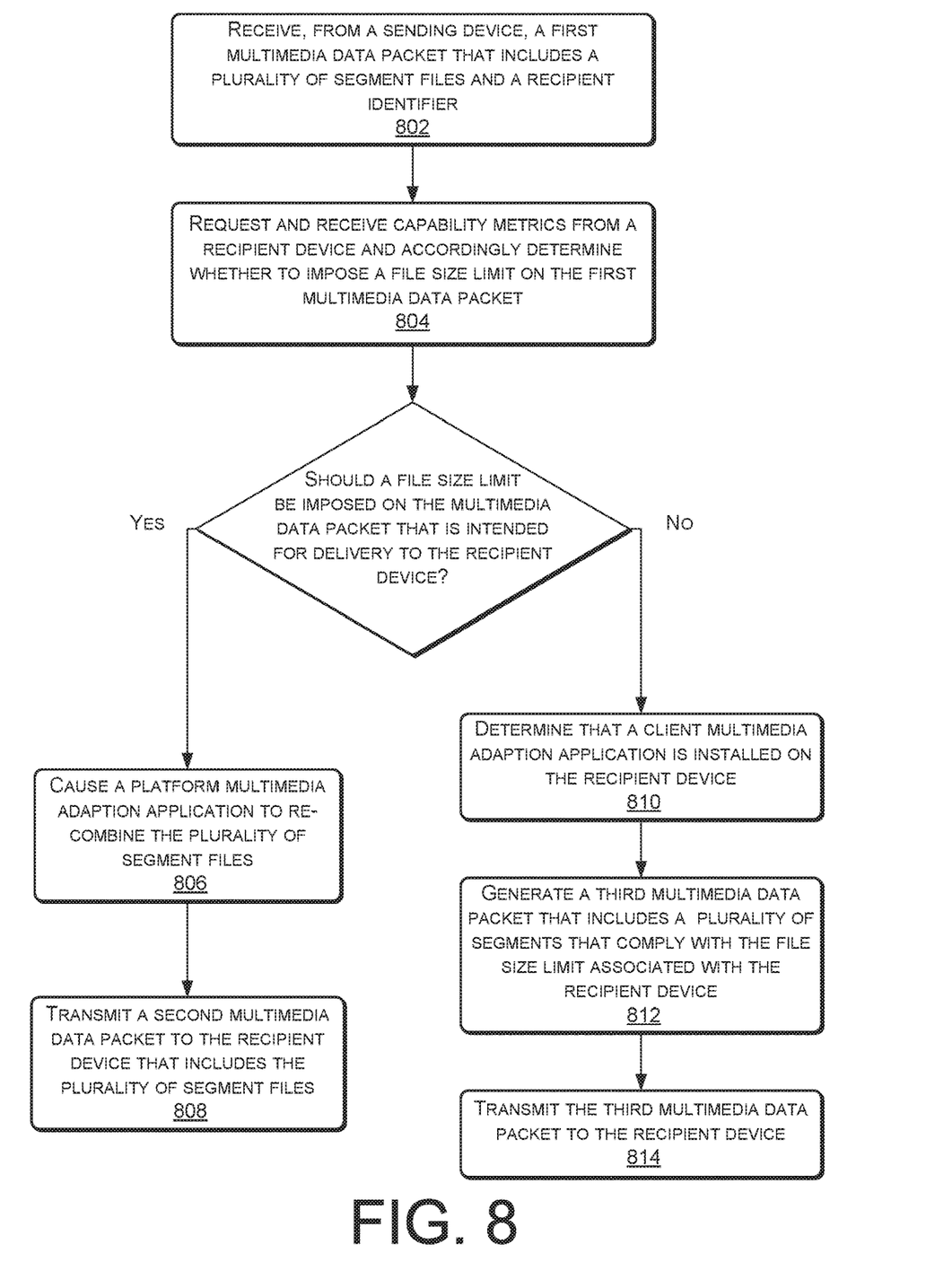
FIG. 8 illustrates a flow diagram of a platform server process for receiving a plurality of segment files from a sending device, and re-combining the plurality of segment files to create a multimedia file that substantially reproduces the multimedia content of an original multimedia file.

FIGS. 7 and 8 present processes 700 and 800. Each of processes 700 and 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700 and 800 are described with reference to the computing environment 100 of FIG. 1.

FIG. 7 illustrates a flow diagram of a platform server process for partitioning a multimedia file into a plurality of segment files and transmit the plurality of segment files to a recipient device. In various examples, the plurality of segment files may include playable segment files, or segment files that can be re-compiled to substantially reproduce the multimedia content of the multimedia file.

At 702, a platform server may receive a first multimedia data packet from a sending device that is intended for delivery to a recipient device. The first multimedia data packet may include a first multimedia file and a recipient identifier. The recipient identifier may identify the recipient device and a platform server associated with the recipient device. Additionally, the multimedia file may include one of a video file, an image file, an audio file, a data file, or an executable file.

At 704, the platform server may request and receive one or more capability metric(s) from the recipient device to determine whether to impose a file size limit on the multimedia data packet, specifically the multimedia file, being sent to the recipient device.

At 706, the platform server may determine that a file size limit need not apply to the multimedia file, based at least in part on the capability metrics of the recipient device. In doing so, the platform server may transmit the first multimedia data packet to the recipient device.

At 708, the platform server may determine that a file size limit is to be imposed to the multimedia file, and further solicit an indication from the recipient device to determine whether the recipient device has a client multimedia adaption application installed. In various examples, a client multimedia adaption application may be required on the recipient device to re-combine a plurality of segment files that are transmitted to the recipient device.

At 710, the platform server may receive an indication from the recipient device that a client multimedia adaption application is installed on the recipient device. In doing so, the platform server may cause a platform multimedia adaption application, native to the platform server, to partition the multimedia file of the multimedia data packet into a plurality of segment files. Each segment file of the plurality of segment files may be configured to comply with the file size limit that is based on the capability metrics of the recipient device. Further, each segment file may include header data that indicates a placement order of the segment file relative to the remaining plurality of segment files. For example, header data of a particular segment file may indicate that the particular segment file is sequentially ordered third among the plurality of segment files.

At 712, the platform server may transmit a second multimedia data packet to the recipient device that includes the plurality of segment files. The plurality of segment files, when re-combined on the recipient device, may substantially reproduce the multimedia content of the first multimedia file.

At 714, the platform server may receive an indication from the recipient device that a client multimedia adaption application is not installed on the recipient device. In this instance, the recipient device may be unable to re-combine a plurality of segment files to create a second multimedia file that substantially reproduces the multimedia content of the first multimedia file. Thus, the platform server may cause a platform multimedia adaption application, native to the platform server, to partition the first multimedia file into a plurality of playable segment files that when executed or played individually and in sequential order, substantially reproduce the multimedia content of the first multimedia file. In various examples, the platform server may partition any type of multimedia file into a plurality of playable segment files provided that each of the playable segment files can be executed or played individually on the recipient device. In some examples, the multimedia file may include a video file or an audio file.

At 716, the platform server may generate and transmit a third multimedia data packet to the recipient device that includes the plurality of playable segment files. Further, the plurality of playable segment files, when executed or played individually and in sequential order, may substantially reproduce the multimedia content of the first multimedia file sent by the sending device.

FIG. 8 illustrates a flow diagram of a platform server process for receiving a plurality of segment files from a sending device, and re-combining the plurality of segment files to create a multimedia file that substantially reproduces the multimedia content of an original multimedia file.

At 802, the platform server may receive, from a sending device, a first multimedia data packet that includes a plurality of segment files and a recipient identifier. The recipient identifier may identify the recipient device and a platform server associated with the recipient device. Further, the plurality of segment files may correspond to an original multimedia file that the sending device intended for delivery to the recipient device. The original multimedia file may include one of a video file, an image file, an audio file, a data file, or an executable file.

At 804, the platform server may request and receive one or more capability metric(s) from the recipient device and accordingly determine whether to impose a file size limit on the first multimedia data packet, specifically the multimedia file, being sent to the recipient device. The capability metrics may include at least one of processor, memory, input/output interface, and telecommunication data metrics of the recipient device.

At 806, the platform server may determine that a file size limit need not be imposed on the first multimedia data packet, based at least in part on the capability metrics of the recipient device. In doing so, the platform server may cause a platform multimedia adaption application, native to the platform server, to re-combine the plurality of segment files to create a second multimedia file that substantially reproduces the multimedia content of the first multimedia file.

At 808, the platform server may transmit a second multimedia data packet to the recipient device that includes the second multimedia file.

At 810, the platform server may determine that a file size limit should apply to the first multimedia data packet, specifically the first multimedia file, based at least in part on the capability metrics of the recipient device. In doing so, the platform server may further determine that a client multimedia adaption application is installed on the recipient device, based at least in part on indication received from the recipient device. In various examples, a client multimedia adaption application may be required on the recipient device to re-combine a plurality of segment files received by the recipient device.

At 812, the platform server may generate a third multimedia data packet for transmission to the recipient device. In a first non-limiting example, the platform server may determine that a file size limit associated with the recipient device is substantially similar or greater than a file size limit associated with the sending device. In doing so, the platform server may include the plurality of segment files received from the sending device in the third multimedia data packet that is intended for transmission to the recipient device.

In a second non-limiting example, the platform server may determine that the file size limit associated with the recipient device is a smaller file size relative to the file size limit associated with the sending device. In this example, the platform server may cause the platform multimedia adaption application, native to the platform server, to re-combine the first plurality of segment files received from the sending device and generate a single multimedia file that substantially reproduces the multimedia content of the original multimedia file. Further, the platform multimedia adaption application may partition the single multimedia file into a second plurality of segment files, whereby each segment file complies with the smaller file size limit of the recipient device. In doing so, the platform server may include the second plurality of segment files in the third multimedia data packet that is intended for transmission to the recipient device.

At 814, the platform server may transmit the third multimedia data packet to the recipient device that includes the plurality of segment files received from the sending device, or a second plurality of segment files that were processed by the platform server of the recipient device.

Accordingly, the techniques described herein enable telecommunication devices to communicate multimedia files of varying file size across different communication platforms, such as RCS-to-MMS, without having to distort or degrade the quality of multimedia content, and without requiring both the sending and recipient devices to participate in a real-time network session.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
receiving, from a sending device, a first multimedia data for delivery to a recipient device, the first multimedia data including a first set of segment files that represent a multimedia file, the first set of segment files having individual first segment files with a first file size that is based on a first file size limit of the sending device;
transmitting, to the recipient device, a request for one or more capability metrics of the recipient device;
determining a second file size limit associated with the recipient device, based at least in part on the capability metrics;
in response to the first file size of the individual first segment files of the first set of segment files being greater than the second file size limit, creating a second set of segment files by combining the first set of segment files to recreate the multimedia file as a recreated multimedia file and partitioning the recreated multimedia file to create the second set of segment files, the second set of segment files having individual second segment files with a second file size less than the second file size limit; and
generating a second multimedia data for delivery to the recipient device that includes the second set of segment files, based at least in part on the first file size of the first set of segment files being greater than the second file size limit.

2. The computer-implemented method of claim 1, further comprising:
transmitting, to the recipient device, an additional request for an indication that a client multimedia adaption application is installed on the recipient device; and
determining that the client multimedia adaption application is not installed on the recipient device, based at least in part on a response to the additional request, and
wherein, the second set of segment files correspond to individually playable segment files.

3. The computer-implemented method of claim 2, wherein the individually playable segment files include one of a video file or an audio file, and
wherein the individually playable segment files, when executed or played individually and in sequential order, re-create multimedia content of the multimedia file.

4. The computer-implemented method of claim 1, further comprising:
in response to the first file size of the individual first segment files being less than or equal to the second file size limit, determining a cumulative file size of the individual first segment files; and
in response to the cumulative file size being less than the second file size limit, generating the second multimedia data to include the recreated multimedia file.

5. The computer-implemented method of claim 1, further comprising:
determining that a client multimedia adaption application is installed on the recipient device, and
wherein, creating the second set of segment files further comprises configuring the second set of segment files for re-combination by the client multimedia adaption application on the recipient device.

6. The computer-implemented method of claim 1, further comprising:
determining a communication platform that is associated with the recipient device; and determining that the communication platform imposes file size limits for delivery of multimedia content to client devices,
wherein the file size limit for delivery of the second multimedia data to the recipient device is further based at least in part on the file size limits associated with the communication platform.

7. The computer-implemented method of claim 1, further comprising:
in response to the first file size of the individual first segment files being less than or equal to the second file size limit, determining a cumulative file size of the individual first segment files; and
in response to the cumulative file size being greater than the second file size limit, generating the second multimedia data to include the first set of segment files.

8. A platform server, comprising:
one or more processors;
memory accessible by the one or more processors; and
the memory including one or more components that are executable by the one or more processors to perform acts comprising:
receiving, from a sending device, a first multimedia data for delivery to a recipient device, the first multimedia data including a first set of segment files that represent a multimedia file, the first set of segment files having individual first segment files with a first file size that is based on a first file size limit of the sending device;
determining a second file size limit that is associated with the recipient device;
in response to a cumulative file size of the first set of segment files being less than the second file size limit, combining the first set of segment files to recreate the multimedia file as a recreated multimedia file; and
generating, a multimedia data that includes the recreated multimedia file.

9. The platform server of claim 8, wherein the components are further executable by the one or more processors to perform acts comprising:
in response to the first file size of the first set of segment files being less than the second file size limit, determining whether a client multimedia adaption application is installed on the recipient device; and
in response to the client multimedia adaption application being installed, transmitting the first set of segment files to the recipient device.

10. The platform server of claim 8, wherein the components are further executable by the one or more processors to perform acts comprising:
accessing header data within the first set of segment files, the header data indicating a placement order of the individual segment files relative to one another, and
wherein the recreated multimedia file is generated based at least in part on the header data.

11. The platform server of claim 8, wherein the components are further executable by the one or more processors to perform acts comprising:
determining that the first file size of the first set of segment files is less than the second file size limit;
determining that a client multimedia adaption application is not installed on the recipient device;
converting the first set of segment files to a second set of playable segment files; and
transmitting the second set of playable segment files to the recipient device.

12. A system comprising:
one or more processors;
memory coupled to the one or more processors, the memory including one or more modules that are executable by the one or more processors to:
receive, from a sending device, a first multimedia data for delivery to a recipient device, the first multimedia data including a recipient identifier and a first set of segment files that represent a multimedia file, the first set of segment files having individual first segment files with a first file size that is based on a first file size limit of the sending device;
determine a second file size limit that is associated with the recipient device;
in response to the first file size of the first set of segment files being greater than the second file size limit, create a second set of segment files associated with the multimedia file by combining the individual first segment files to recreate the multimedia file as a recreated multimedia file and partitioning the recreated multimedia file into the second set of segment files, wherein individual second segment files of the second set of segment files have a second file size less than the second file size limit; and
transmit the second set of segment files to the recipient device via a recipient communication platform that is identified by the recipient identifier associated with the recipient device.

13. The system of claim 12, wherein the recipient communication platform imposes file size limits for delivery of multimedia content to client devices, and
wherein the second file size limit for delivery of the first multimedia data to the recipient device is based at least in part on the recipient communication platform.

14. The system of claim 13, wherein the recipient communication platform corresponds to a multimedia messaging service platform.

15. The system of claim 12, wherein the one or more modules are further executable by the one or more processors to:
transmit, to the recipient device, a request for one or more capability metrics associated with the recipient device, and
wherein the second file size limit for delivery of the second set of segment files to the recipient device is further based at least in part on the one or more capability metrics of the recipient device.

16. The system of claim 15, wherein the one or more capability metrics associated with the recipient device relate to metrics associated with at least one of a processor, a memory, an input interface, an output interface, or a telecommunication bandwidth of the recipient device.

17. The system of claim 12, wherein the second set of segment files include header data that indicates a placement order relative to remaining segment files of the second set of segment files.

18. The system of claim 12, wherein the multimedia file includes a video file, an audio file, an image file, a data file, or an executable file.

19. The system of claim 12, wherein the one or more modules are further executable by the one or more processors to:
determine that an initial communication platform associated with the recipient device is offline, the initial communication platform corresponding to a Rich Communications Service (RCS) platform; and
select the recipient communication platform, the recipient communication platform corresponding to a multimedia messaging service (MMS) platform, and
wherein, to determine the second file size limit is based at least in part on the recipient communication platform.

* * * * *